(12) United States Patent
Swanson et al.

(10) Patent No.: US 6,775,640 B1
(45) Date of Patent: Aug. 10, 2004

(54) PERFORMANCE ADDER FOR TRACKING OCCURRENCE OF EVENTS WITHIN A CIRCUIT

(75) Inventors: Jeffrey C. Swanson, Sunnyvale, CA (US); John A. Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,189

(22) Filed: Apr. 28, 2000

(51) Int. Cl.[7] .................................................. G06F 7/42
(52) U.S. Cl. ...................................... 702/182; 702/189
(58) Field of Search ................................ 702/182, 117, 702/179, 183, 186, 187, 189, FOR 103, FOR 104, FOR 134, FOR 135, FOR 139, FOR 170, FOR 171; 714/39, 47, 37, 45; 708/629, 672, 708–710, 760

(56) References Cited

U.S. PATENT DOCUMENTS

| | | | |
|---|---|---|---|
| 5,537,541 A | 7/1996 | Wibecan | 395/183.21 |
| 5,557,548 A | 9/1996 | Gover et al. | 364/551.01 |
| 5,675,729 A | 10/1997 | Mehring | 395/183.13 |
| 5,796,939 A | 8/1998 | Berc et al. | 395/184.01 |
| 5,881,306 A * | 3/1999 | Levine et al. | 712/23 |
| 5,919,268 A * | 7/1999 | McDonald | 714/47 |
| 5,937,437 A * | 8/1999 | Roth et al. | 711/202 |
| 6,275,782 B1 * | 8/2001 | Mann | 702/182 |
| 6,446,029 B1 * | 9/2002 | Davidson et al. | 702/186 |

* cited by examiner

Primary Examiner—Hal D. Wachsman

(57) ABSTRACT

A performance adder for providing a running total of performance values within an integrated circuit chip. The performance adder is triggered by various performance events as determined through multiplexer logic for detecting occurrence of a particular performance event. The multiplexer logic can also trigger the performance adder through atomic, edge, toggle, or on/off signals related to the performance events or through a logical function of a combination of performance events. The performance adders can be used to compute average latency of a component in the circuit.

9 Claims, 5 Drawing Sheets

PERFORMANCE ADDER FOR TRACKING OCCURRENCE OF EVENTS WITHIN A CIRCUIT

FIELD OF THE INVENTION

The present invention relates to an apparatus and method for tracking occurrence of events within a circuit and, more particularly, for computing averages or other parameters for multiple agents within a circuit.

BACKGROUND OF THE INVENTION

Performance incrementers are often used to track internal operation of an integrated circuit chip to determine its performance. FIG. 1 is a diagram of a prior art performance incrementer 10, used to count and maintain a running total of various events within a circuit. Performance incrementer 10 includes a multiplexer 14 that receives on lines 16 a plurality of performance events from various locations within a circuit to be monitored. A mode select line 15 determines which of the performance events are transmitted to performance incrementer 10 through multiplexer 14. The transmitted performance event is input to a control line 20 for a multiplexer 12 for use incrementing a value within a register 11.

In particular, multiplexer 12 receives as inputs the value of register 11 on line 18 and an incremented value through incrementer logic 13 on line 17. Therefore, when the signal selected_event_increment on line 20 is high (logic "one"), multiplexer 12 transmits the signal on line 17 through to register 11. The input on line 17 is equal to the output of register 11 incremented by one through incrementer logic 13. The output of register 11 on line 19 thus represents a performance incrementer final value. This value is equal to a running total of the number of performance events that have occurred as detected through multiplexer 14.

A common performance metric that can be tracked using performance incrementer 10 includes bandwidths. Typically, for a metric such as bandwidth, performance incrementer 10 increments on each cycle for detecting a first-in-first-out (FIFO) buffer pushing or popping an entry, or detecting a bus having valid data through the performance event signals input to multiplexer 14.

It is also desirable to track latencies within a circuit. However, latencies tend to be more difficult to monitor and usually require higher level software algorithms to infer the latencies based on the bandwidths attained. Use of software results in a higher level of abstraction in performance analysis, and thus it is usually not possible to determine precise latencies within a chip using software algorithms. Furthermore, latency varies for each transaction flowing through a system.

Therefore, in order to track the latency of all transactions in a particular "snapshot" of time, a separate performance incrementer is needed for each transaction. Most systems can have thousands or even millions of transactions in the duration of time during which latencies are desired to be measured, making it infeasible to include enough performance incrementers to track them all. Also, traditional performance incrementer 10 typically cannot track other types of performance metrics such as average depth in FIFOs or flow control credits, or an average number of cache entries used.

Accordingly, a need exists for a circuit which provides for more versatility in tracking the occurrence of various performance events within a circuit.

SUMMARY OF THE INVENTION

A performance adder circuit consistent with the present invention includes a register for storing a performance adder final value. Multiplexer logic provides performance values and selected event signals based upon events occurring within a circuit. A logic circuit, coupled to the register and the multiplexer logic, adds the performance values based upon the selected event signals and stores a resulting signal in the register.

A performance adder circuit consistent with the present invention can be used in computing latency related to a component in a circuit. It includes a first performance adder (or incrementer) receiving a first transaction value and providing a first output value representing a number of transactions that have been initiated involving a particular component. A second performance adder receives a second transaction value, related to the first transaction value, and provides a second output value related to a latency of the component. The first and second output values can be used to calculate the average latency related to the component.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
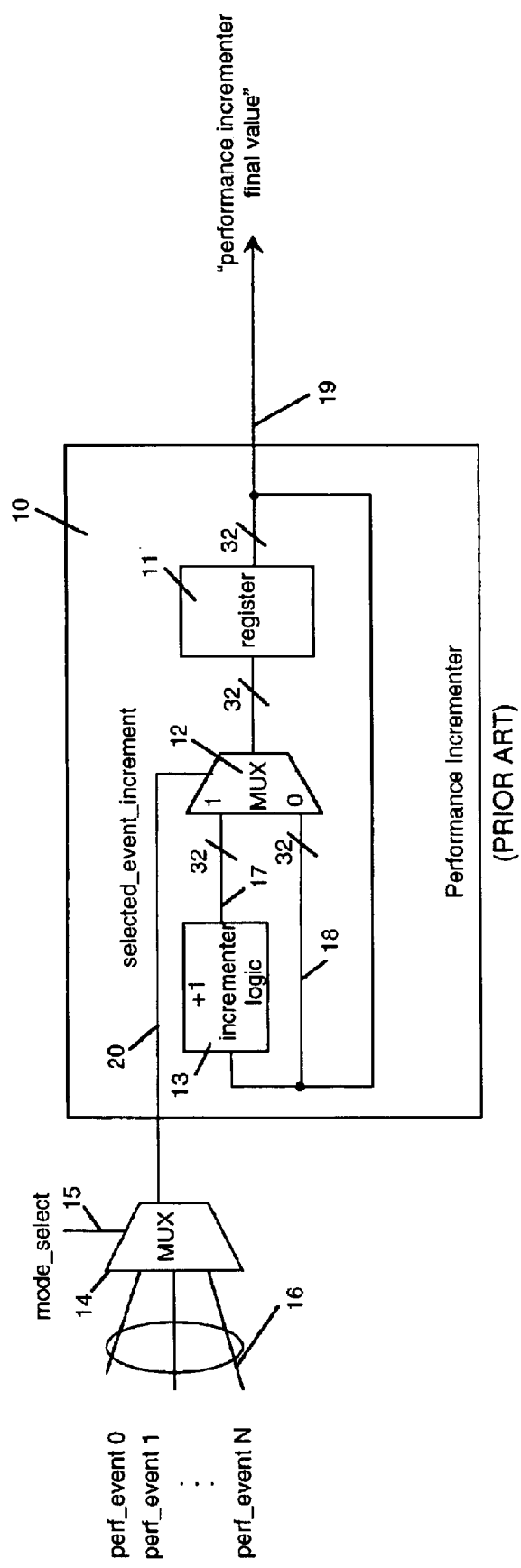
FIG. 1 is a block diagram of a prior art performance incrementer for tracking the occurrence of performance events within a circuit.
Figure 2:
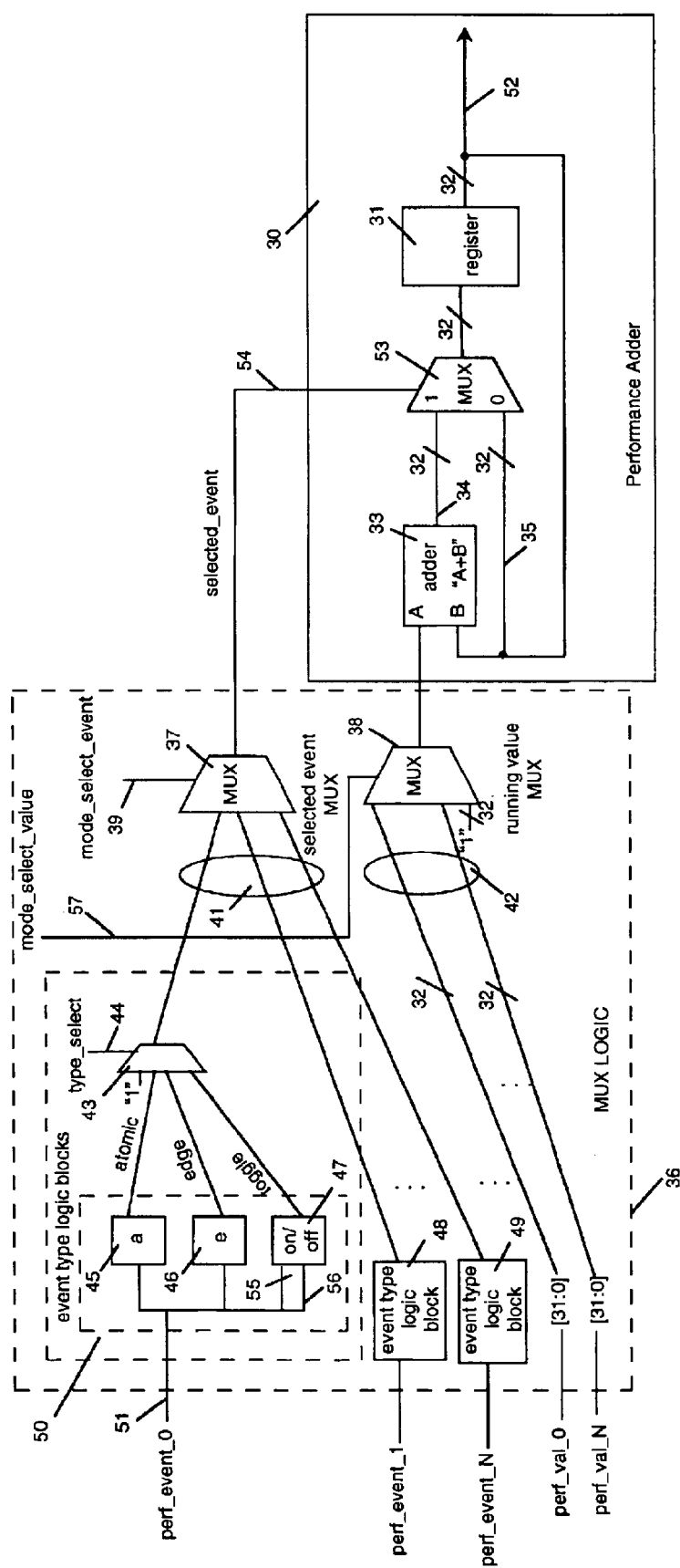
FIG. 2 is a diagram of a performance adder for tracking various performance events within a circuit consistent with the present invention.

FIG. 2 is a diagram of a performance adder 30 consistent with the present invention. Performance adder 30 provides the ability to add a variety of performance events within a circuit and provide indications of performance values. Performance adder 30 includes a logic circuit for adding the performance values based upon event triggers. The ability to track the running summation of performance values provides for the ability to calculate latencies related to circuit components as well as many other metrics.

Performance adder 30 includes a register 31 for storing a value representing a running summation of performance values within a circuit to be monitored. A multiplexer 53 receives as inputs the output of register 31 on line 35 and a summation value on line 34. An adder circuit 33 adds the signals output from register 31 and as received from a multiplexer 38. The term "signal" includes single-bit and multi-bit values. Multiplexer 38 selectively transmits performance values representing performance events occurring within the circuit, as further illustrated below. These performance values are generated by other logic within the circuit to be monitored.

The value in register 31 is changed according to a selected_event_increment signal on line 54 controlling multiplexer 53. When the selected_event signal is high (logic "one"), multiplexer 53 transmits from line 34 the summation signal through to register 31, which then stores the resulting summation signal to be output on line 52 as a performance adder final value.

Multiplexer logic 36 provides for selecting performance values to be input to adder 33, and selecting performance events signals for control line 54. The performance event signals are received and input to a multiplexer 37, which selects a performance event signal from one of lines 41 based upon a mode select event signal on line 39. A selected performance event signal is transmitted through to line 54 as the selected event signal in order to control multiplexer 53. The performance event signals are generated by other logic within the circuit to be monitored.

Each of the performance event signals may be transmitted through signal detection logic, such as logic 50, for tracking a variety of types of the performance event signals. Logic 50 includes event type logic blocks. For example, a performance event zero (perf_event_0) on line 51 is transmitted through atomic logic 45 for atomic signal detection, edge logic 46 for edge signal detection, and toggle or on/off logic 47 for toggle or on/off signal detection. Each of those types of signals is input to a multiplexer 43 controlled by a type_select signal on line 44 for selecting the type of signal (atomic, edge, or toggle) to be input to multiplexer 37. Multiplexer 43 can also include, as shown, a high ("1") input in order for performance adder 30 to function as a running value adder for every cycle.

Logic for detecting atomic, edge, toggle, and on/off signals is known in the art. Logic 45, 46, and 47 can be implemented with such known logic for detecting those types of signals. An atomic signal is a single-bit signal incrementing for each cycle when the signal is high. Performance adder 30 may have a performance value of one sent into it with zeroes extended for the most significant bits in order for it to function as an incrementer.

An edge count detected by logic 46 is a single-bit signal or used as running total gating signal. This type of event increments each time the signal becomes high, or low, or both depending on a particular mode. An edge detection signal is used to count rising and falling edges of signals or both. This type of signal is useful for events such as detecting how many times a FIFO buffer becomes full, using the atomic count to determine the total number of cycles it is full, or to compute the average depth of a FIFO buffer when a pipe stage begins to stall.

A toggle or on/off count is a single-bit signal or used as running total gating signal. This type of count will start the performance value increment when the toggle signal is high and end it the next time the signal is high. The "turn on" and the "turn off" inputs on lines 55 and 56 are individual signals providing for added flexibility. They may be tied together for a single performance event signal, as shown, to produce a "toggle" mechanism. Alternatively, lines 55 and 56 may receive separate performance event signals; for example, line 55 receiving perf_0 event_signal and line 56 receiving perf_event_1 signal. Using separate signals (on/off signals), toggle logic 47 can be used to detect individual latencies by turning on the counter for one edge of a signal and turning off the counter for another edge of the signal.

Another type of performance event signal is a running total or multi-bit field signal. This type of event enables computation of averages, for example, and can be gated by any of the other three performance events types (atomic, edge, or toggle).

The other performance event signals may also be transmitted to similar logic. For example, event type logic block 48 and event type logic block 49 may include the same circuitry as logic 50 for providing the three types of signal detections for those performance event signals, perf_event_1 to perf_event_N. These performance event signals thus determine when to add performance values through control of multiplexer 53. The type_select and mode_select_event_signals on lines 44 and 39 for selecting the various performance event signals can be generated using a performance control block, implemented in hardware, software, or a combination, generating the control signals based upon a particular implementation desired by a user.

Performance value signals (perf_val_0 to perf_val_N) are input on lines 42 to multiplexer 38. Multiplexer 38 is controlled by a mode_select-value_signal on line 57 for determining which performance value to transmit through to adder 33. Although shown receiving independent control signals, lines 39 and 57 could be wired together for a one-to-one mapping of the mode_select_event and mode_select_value signals. Also, multiplexer 38 can include, as shown, a high ("1") input for performance adder 30 to function as an incrementer.

In operation, one of the performance values is transmitted through to adder 33 and, when the selected performance event is detected, a high (logic "one") signal on line 54 causes multiplexer 53 to transmit the signal on line 34. Adder 33 generates the signal on line 34 by adding the performance value (signal A) received from multiplexer 38 with the output of register 31 (signal B) to produce a running summation of performance values occurring within the circuit. The resulting signal is transmitted through multiplexer 53 to register 31 and output on line 52 as the performance adder final value. Selection of both the high ("1") input to multiplexer 43 and the high ("1") input to multiplexer 38 results in the degenerative case of a clock counter where performance adder 30 adds by one on every cycle to essentially count clock cycles.

Figure 3:
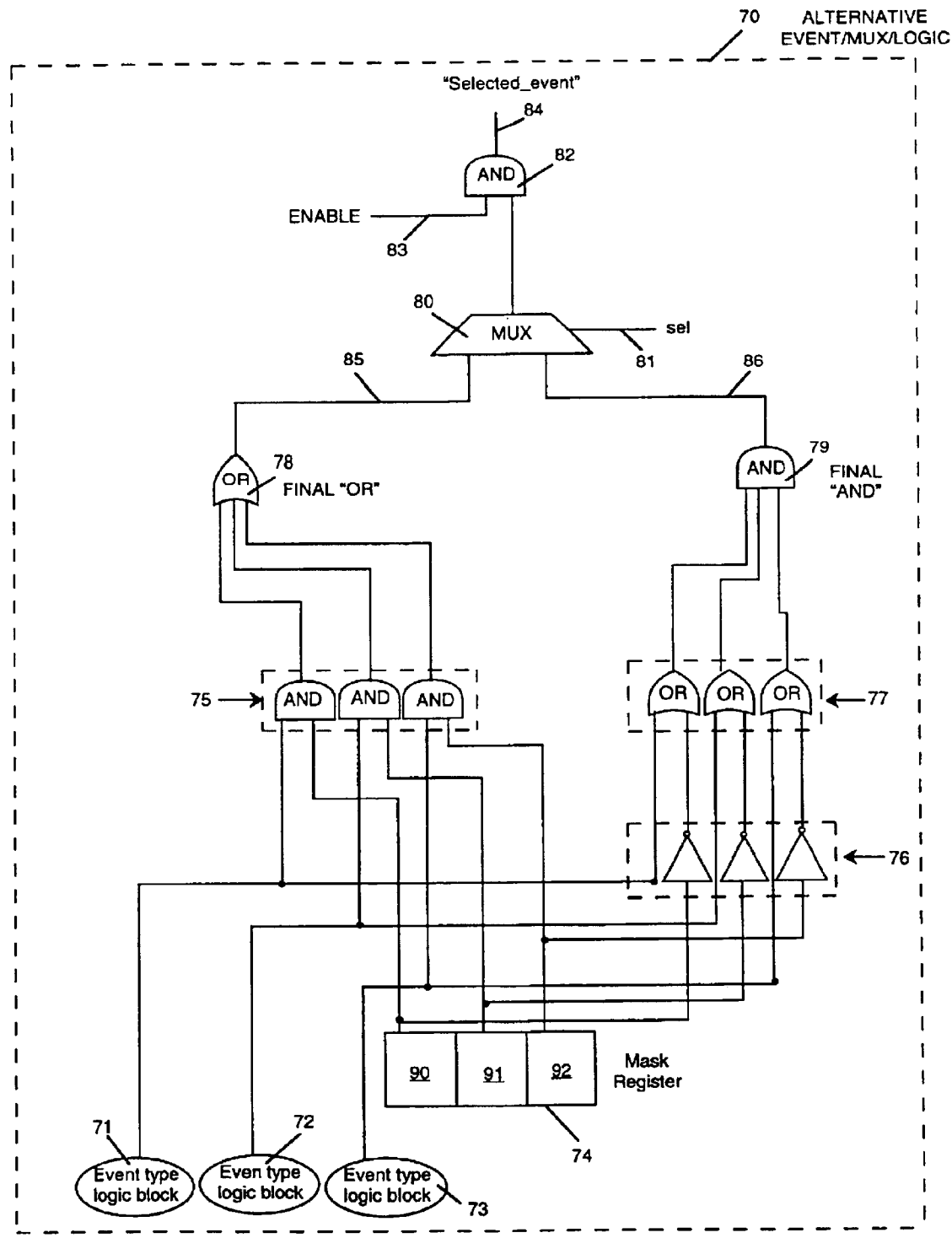
FIG. 3 is diagram of alternative multiplexer logic for use with the performance adder.

FIG. 3 is a diagram illustrating an alternative logic function circuit for controlling multiplexer 53. In the logic shown in FIG. 2, adder 33 adds the input signals in response to the occurrence of one particular performance event as detected through multiplexer 37. Logic 70 shown in FIG. 3 illustrates how multiplexer 53 can be controlled to add performance values in response to the occurrence of multiple types of signals. Logic 70 includes a plurality of performance event triggers occurring in hardware through event type logic blocks 71, 72, and 73, which represent event type logic (atomic, edge, toggle, or on/off). That logic provides the performance event signals, such as those described with respect to FIG. 2. The performance event signals are input to a plurality of AND gates 75 and to a plurality of OR gates 77.

A mask register 74 implemented in software, for example, provides a plurality of bits such as bit 90 for the other inputs to AND gates 75 and to OR gates 77 through inverters 76. Mask register 74 provides mode enable bits (90, 91, and 92) for enabling and disabling the performance event signals from event type logic blocks 71, 72, and 73. For example, if bit 90 has a value of zero, it disables the performance event signal from event type logic block 71, since the output of the respective AND gate will always be a value zero and the output of the respective OR gate will always be a value one. Conversely, setting bit 90 to a value of one enables the performance event signal from event type logic block 71.

The outputs of AND gates 75 are input to an OR gate 78 (a final "OR" logical function of the performance events), and the outputs of OR gates 77 are input to an AND gate 79 (a final "AND" logical function of the performance events). A multiplexer 80 receives the outputs of gates 78 and 79 on, respectively, lines 85 and 86, and it selectively transmits one of those signals based upon a control signal on line 81. An AND gate 82 receives the output of multiplexer 80 and is controlled by an ENABLE signal on line 83 in order to transmit and output a signal ("selected_event") on line 84 to multiplexer 53.

Therefore, as shown by logic 70, performance adder 30 can be controlled based upon the occurrence of a logical function of multiple types of performance event triggers within event type logic blocks 71–73. In particular, by selecting line 85, performance adder 30 will add performance values in response to occurrence of any unmasked (mask bit=1) performance events from event type logic blocks 71–73 (an "OR" logical function of the performance events). Conversely, by selecting line 86, performance adder 30 will add performance values only in response to occurrence of all unmasked (mask bit=1) performance events from event type logic blocks 71–73 (an "AND" logical finction of the performance events). Other logical functions of the occurrence of performance events are possible for controlling multiplexer 53 in performance adder 30.

Figure 4:
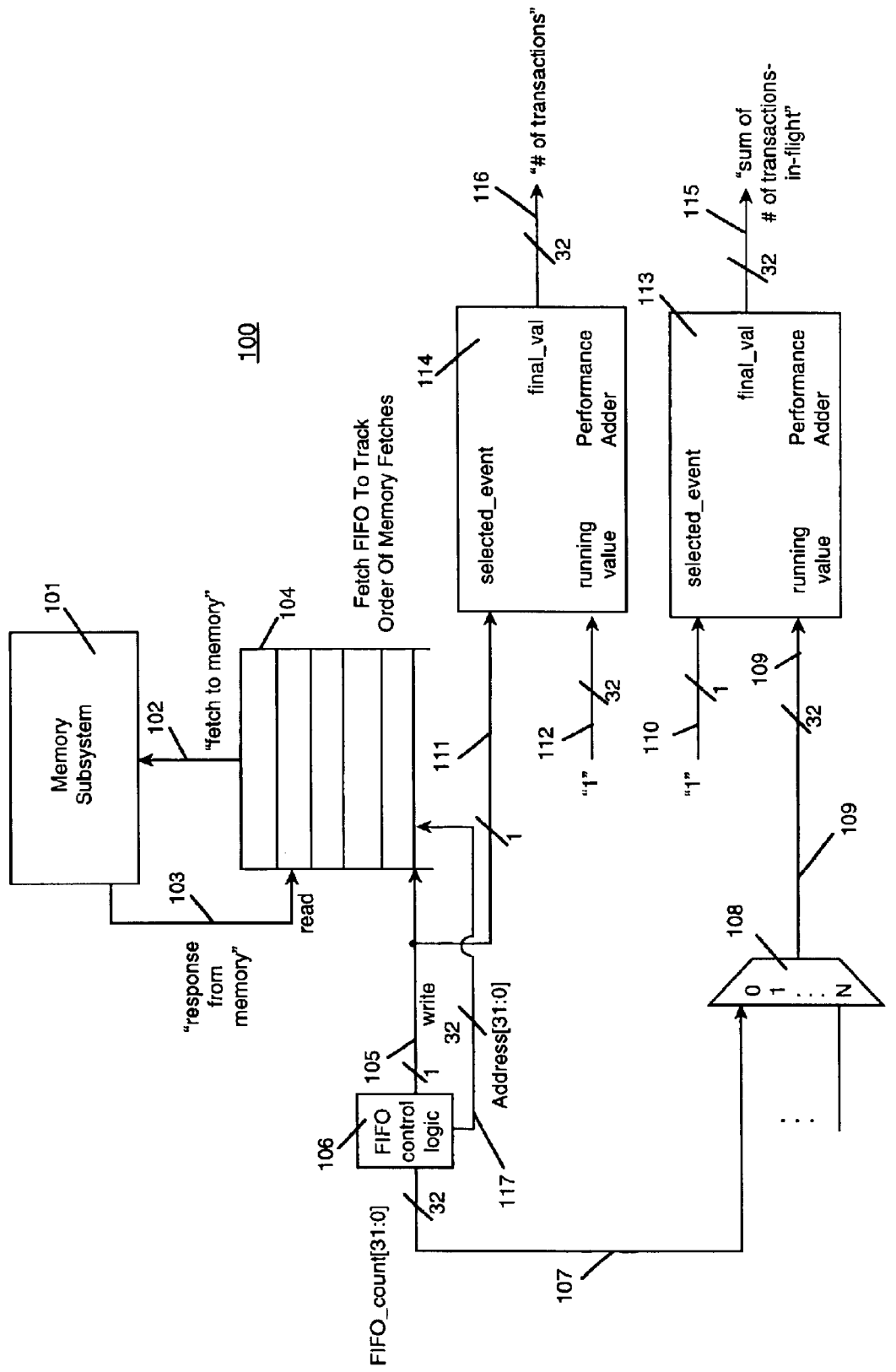
FIG. 4 is a block diagram of an exemplary use of the performance adder for computing average latency in fetching data from memory.

FIG. 4 is a diagram of a circuit 100 for using the performance adder to compute average fetch latency from memory. The performance adder is combined with existing circuitry for making fetch requests from memory in order to compute the average fetch latency. In circuit 100, a fetch FIFO buffer 104 provides a fetch request 102 to memory 101. Memory 101 provides responses 103 back to the fetch FIFO buffer 104. FIFO buffer 104 typically contains the addresses of memory space to fetch data from in memory 101 The write signal on line 105 is used to load ("push") a fetch transaction into FIFO buffer 104, and the read signal on line 103 is used to unload ("pop") a fetch transaction from FIFO buffer 104 to memory 101.

FIFO control logic 106 generates the fetch (for example, address) requests on lines 117 and transmits them on line 105 to fetch FIFO buffer 104 and also generates a FIFO_count signal on line 107. The FIFO_count signal is a multi-bit field representing the number of fetches within FIFO buffer 104 on a particular cycle and is typically already generated by FIFO control logic 106 to track when FIFO buffer 104 is full or empty. Performance adders 113 and 114 are connected with FIFO control logic 106 to provide for computing the average fetch latency based upon that existing signal. Performance adders 113 and 114 may be implemented with the same logic as performance adder 30.

Performance adder 113 receives the FIFO_count signal on line 109 as transmitted through a running value multiplexer 108, similar to multiplexer 38 shown in FIG. 2. Performance adder 113 maintains a running value of the number of fetches in FIFO buffer 104 as added in response to a logic one signal maintained on line 110 that would be input to multiplexer 53. An output 115 of performance adder 30 thus provides a running total of the number of fetches in FIFO buffer 104 representing the sum of the number of transactions in flight to memory 101. For example, if FIFO buffer 104 contains two fetch transactions, then performance adder 113 adds the value "2" per cycle to the running total while FIFO buffer 104 contains two transactions.

Performance adder 114 receives as inputs the output from the write wire on line 111 and a logic one value on line 112 to provide a running total of the number of transactions. Although the input on line 112 is shown as a single-bit value, it can be implemented with a multi-bit value for a circuit that issues more than one transaction per cycle. With a logic one value on line 112, performance adder 114 functions as an incrementer to increment by a value one a running total of the number of transactions pushed to fetch FIFO 104. The fetch triggers the write signal on line 111, which in turn would control multiplexer 53 of performance adder 114. The output on line 116 represents the total number of fetch transactions sent to FIFO buffer 104.

By using the values output on lines 115 and 116, an average latency can be calculated. The average latency is the sum of the number of transactions-in-flight across all cycles (value on line 115) divided by the number of transactions (value on line 116).

Figure 5:
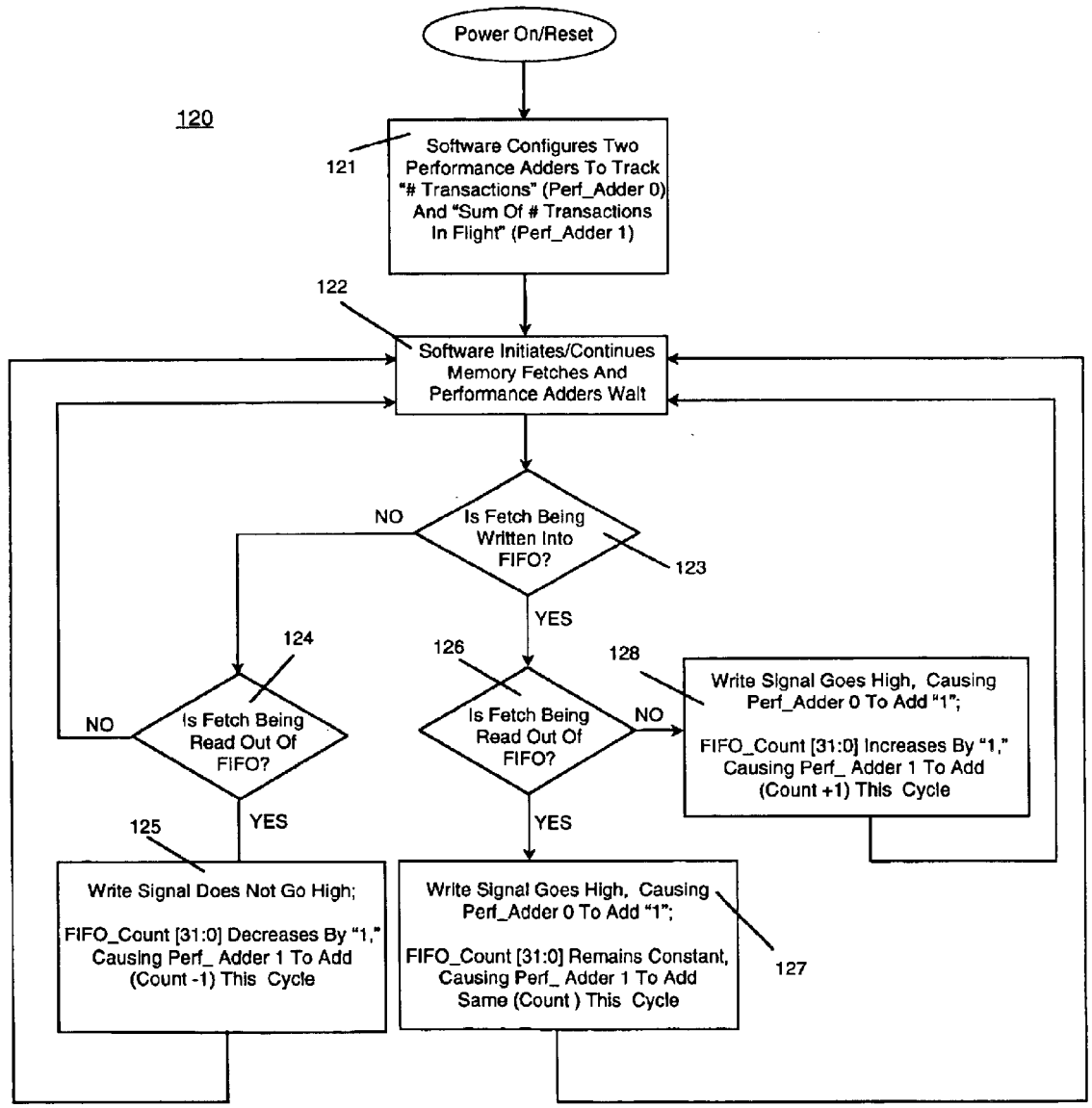
FIG. 5 is a flow chart of a method for computing average latency in fetching data from memory using the circuit shown in FIG. 4.

FIG. 5 is a flow chart of a method 120 for computing average latency in fetching data from memory using the circuit shown in FIG. 4. In method 120, software configures two performance adders to track the "# of transactions" (performance adder 0) and the "sum of # of transactions in flight"(performance adder 1) (step 121). The software initiates or continues memory fetches, and the performance adders wait for an event (step 122).

The circuit determines if a fetch is being written into a FIFO buffer (step 123) and if the fetch is being read out of the FIFO buffer (steps 124 and 126), which results in four possible conditions. First, if a fetch is not being written into the FIFO buffer (step 123) and if the fetch is not being read out of the FIFO buffer (step 124), the performance adders wait for an event (step 122).

Second, if a fetch is not being written into the FIFO buffer (step 123) and if the fetch is being read out of the FIFO buffer (step 124), the write signal does not go high and the FIFO_count [31:0] decreases by "1," causing performance adder 1 to add "count −1" this cycle (step 125).

Third, if a fetch is being written into the FIFO buffer (step 123) and if the fetch is being read out of the FIFO buffer (step 126), the write signal goes high, causing performance adder 0 to add "1," and the FIFO_count [31:0] remains constant, causing performance adder 1 to add the same "count" this cycle (step 127).

Fourth, if a fetch is being written into the FIFO buffer (step 123) and if the fetch is not being read out of the FIFO buffer (step 126), the write signal goes high, causing performance adder 0 to add "1," and the FIFO_count [31:0] increases by "1," causing performance adder 1 to add "count +1" this cycle (step 128).

In addition to average latency, an individual latency can be calculated using the on/off signal alternative to the toggle signal illustrated in logic 47 (see FIG. 2). In particular, logic 47 can receive two separate performance event signals on lines 55 and 56 to detect edges of signals for the individual latency. By using separate on and off events, performance adders 113 and 114 can turn on when a fetch transaction is transmitted to memory on line 102 and turn off when the response is transmitted back on line 103. The performance adders 113 and 114 thus will obtain data representing the individual latency between a fetch to memory and a response from the memory.

Performance adders 113 and 114 are shown as used for determining average fetch latency to memory for exemplary purposes. The performance adders can be used in calculating other types of latencies and metrics as well for a variety of components. Also, other alternative implementations of the performance adder are possible. One alternative is that the width of the running total field input to the adder (input A to adder 33) can be smaller than the total width of the adder, possibly resulting in area savings in an integrated circuit chip implementation. For example, a performance adder may be 32-bits wide, but the widest running total field may be 8 bits. In this example, the running total field of 8 bits allows for 255 entries in a FIFO buffer, translating into 255 outstanding memory fetches in any cycle. The performance adder itself needs to be larger than this 8-bit value, because it must track the latency over a longer period of time, but the tunning total field to the adder need only be 8-bits. Depending on the nature of the running total events tracked in a circuit, this alternative to the adder can be used.

Another alternative is that for the computation of average latencies, only the sum portion of the equation requires a true adder. The number of transactions portion determined by performance adder 114 can be tracked using a traditional performance incrementer (the "atomic" type).

While the present invention has been described in connection with an exemplary embodiment, it will be understood that many modifications will be readily apparent to those skilled in the art, and this application is intended to cover any adaptations or variations thereof. For example, different number and combinations of performance adders and incrementers, different widths of various fields, and different implementations of the performance adder may be used without departing from the scope of the invention. This invention should be limited only by the claims and equivalents thereof.

What is claimed is:

1. A performance adder circuit, comprising:
    a register for storing a performance adder final value;
    multiplexer logic for providing configurably selected performance values and a configurably selected event signal based upon performance events occurring within a circuit, wherein the performance values and event signal selected from available performance values and event signals can be configured; and
    a logic circuit coupled to the register and the multiplexer logic, for adding the performance values based upon the selected event signal and for storing a resulting signal in the register.

2. The performance adder circuit of claim 1 wherein the logic circuit includes:
    an adder having inputs coupled to receive the performance values and an output of the register; and
    a multiplexer having an output coupled to the register, a first input coupled to receive the output of the register, a second input coupled to receive an output of the adder, and a control terminal coupled to receive the selected event signal.

3. The performance adder circuit of claim 1 wherein the multiplexer logic includes a multiplexer having a plurality of inputs coupled to receive the performance values, an output coupled to the logic circuit, and a control terminal coupled to receive a control signal for selecting one of the performance values.

4. The performance adder circuit of claim 1 wherein the multiplexer logic includes a multiplexer having a plurality of inputs coupled to receive the performance events, an output coupled to the logic circuit, and a control terminal coupled to receive a control signal for selecting one of the performance events.

5. The performance adder circuit of claim 4 wherein the multiplexer logic includes atomic logic for detecting an atomic type of the performance events.

6. The performance adder circuit of claim 4 wherein the multiplexer logic includes edge for detecting an edge type of the performance events.

7. The performance adder circuit of claim 4 wherein the multiplexer logic includes toggle for detecting a toggle type of the performance events.

8. The performance adder circuit of claim 4 wherein the multiplexer logic includes on/off logic for detecting an on/off type of the performance events.

9. The performance adder circuit of claim 1 wherein the multiplexer logic includes a logic function circuit for providing the selected event signal based upon a logical function of the performance events.

* * * * *